US012803175B2

(12) United States Patent
Chalabi et al.

(10) Patent No.: US 12,803,175 B2
(45) **Date of Patent: *Nov. 17, 2026**

(54) HYBRID CENTER-FED EDGE-FED METASURFACE ANTENNA WITH DUAL-BEAM CAPABILITIES

(71) Applicant: Kymeta Corporation, Redmond, WA (US)

(72) Inventors: Hamidreza Chalabi, Redmond, WA (US); Mohsen Sazegar, Kirkland, WA (US)

(73) Assignee: Kymeta Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/203,820

(22) Filed: May 9, 2025

(65) Prior Publication Data

US 2025/0364724 A1 Nov. 27, 2025

Related U.S. Application Data

(63) Continuation of application No. 17/707,020, filed on Mar. 29, 2022, now Pat. No. 12,316,001.
(Continued)

(51) Int. Cl.
*H01Q 15/00* (2006.01)
*H01Q 21/00* (2006.01)
*H01Q 25/00* (2006.01)

(52) U.S. Cl.
CPC ..... *H01Q 15/0086* (2013.01); *H01Q 21/0012* (2013.01); *H01Q 25/002* (2013.01)

(58) Field of Classification Search
CPC .................................................. H01Q 15/0086
See application file for complete search history.

(56) References Cited

U.S. PATENT DOCUMENTS

| | | | |
|---|---|---|---|
| 5,049,895 | A | 9/1991 | Ito et al. |
| 5,661,498 | A | 8/1997 | Goto et al. |

(Continued)

FOREIGN PATENT DOCUMENTS

| | | | |
|---|---|---|---|
| JP | 07-074537 | A | 3/1995 |
| JP | 2018-032968 | A | 3/2018 |

OTHER PUBLICATIONS

Ahmed, A., et al., "Metasurface-Enabled Antiparallel Dual-Beam Rectangular-Waveguide Antenna", IEEE Antennas and Wireless Propagation Letters, vol. 19, No. 4, Feb. 19, 2020, pp. 641-645.

(Continued)

*Primary Examiner* — Robert Karacsony

(74) *Attorney, Agent, or Firm* — Womble Bond Dickinson (US) LLP

(57) ABSTRACT

An antenna and method for using the same having a hybrid feed approach. In some embodiments, the metasurface antenna with dual beam capabilities is feed with feed waves from a center-fed waveguide structure and an edge-fed waveguide structure. In some embodiments, the antenna comprises an array of radio-frequency (RF) radiating antenna elements and operable to generate two beams simultaneously in response to interacting with two propagating waves at a same time; and a feed structure coupled to feed the two waves to the array of RF radiating antenna elements, the feed structure having a first waveguide beneath the RF radiating antenna elements in which the two waves propagate in opposite directions.

16 Claims, 11 Drawing Sheets

Related U.S. Application Data

(60) Provisional application No. 63/168,923, filed on Mar. 31, 2021.

(56) References Cited

U.S. PATENT DOCUMENTS

| | | | | |
|---|---|---|---|---|
| 12,316,001 | B2 * | 5/2025 | Chalabi | H01Q 15/0086 |
| 2009/0058747 | A1 | 3/2009 | Haziza | |
| 2018/0123260 | A1 | 5/2018 | Sikes et al. | |
| 2018/0131103 | A1 | 5/2018 | Bily et al. | |
| 2019/0097325 | A1 | 3/2019 | Tatomir | |
| 2021/0203079 | A1 | 7/2021 | Sazegar et al. | |

OTHER PUBLICATIONS

Ex Parte Quayle Action received for U.S. Appl. No. 17/707,020, mailed on Dec. 2, 2024, 4 pages.

Extended European Search Report and Search Opinion received for European Application No. 22782183.2, mailed on Feb. 6, 2025, 13 pages.

Geng, Y. et al., "Dual-Beam and Tri-Band SIW Leaky-Wave Antenna With Wide Beam Scanning Range Including Broadside Direction", IEEE Access, vol. 7, Dec. 5, 2019, pp. 176361-176368.

International Preliminary Report on Patentability received for PCT Patent Application No. PCT/US2022/022766, mailed on Oct. 12, 2023, 8 pages.

International Search Report and Written Opinion received for PCT Patent Application No. PCT/US2022/022766, mailed on Jul. 28, 2022, 11 pages.

Movahhedi, M. et al., "Dual-frequency dual orthogonal polarization wave multiplexing using decoupled pixels based on Holographic technique", Optics Express, vol. 28, No. 8, Apr. 10, 2020, p. 12424.

Non-Final Office Action received for U.S. Appl. No. 17/707,020, mailed on Jun. 21, 2024, 8 pages.

Notice of Allowance received for U.S. Appl. No. 17/707,020, mailed on Feb. 11, 2025, 9 pages.

Notice of Allowance received for U.S. Appl. No. 17/707,020, mailed on Mar. 28, 2025, 2 pages.

Requirement for Restriction/Election received for U.S. Appl. No. 17/707,020, mailed on Apr. 25, 2024, 8 pages.

Takada, J.-I., et al., "A Dual Beam Linearly-Polarized Radial Line Slot Antenna", Jun. 28, 1993, pp. 1-4.

* cited by examiner

HYBRID CENTER-FED EDGE-FED METASURFACE ANTENNA WITH DUAL-BEAM CAPABILITIES

RELATED APPLICATION

The present application is a continuation of Non-Provisional Application Ser. No. 17/707,020, filed Mar. 29, 2022 and entitled "HYBRID CENTER-FED EDGE-FED METASURFACE ANTENNA WITH DUAL-BEAM CAPABILITIES", which is a non-provisional application of and claims the benefit of U.S. Provisional Patent Application No. 63/168,923, filed Mar. 31, 2021 and entitled "HYBRID CENTERFED EDGEFED METASURFACE ANTENNA WITH DUAL-BEAM CAPABILITIES", which is incorporated by reference in its entirety.

FIELD OF THE INVENTION

Embodiments of the invention are related to wireless communication; more particularly, embodiments of the invention are related to antennas for wireless communication that provide feed waves for interacting with radio-frequency (RF) radiating antenna elements using a hybrid of multiple feed structures.

BACKGROUND

Metasurface antennas have recently emerged as a new technology for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

Some previously demonstrated antenna structures have been shown to produce multiple beams at the same time. However, increasing the number of beams with similar bandwidth and directivity for simultaneous connection to different satellites comes at the expense of a required additional area footprint. In other words, the number of beams can be increased as long as the footprint of the antenna is increased in size as well.

SUMMARY

An antenna and method for using the same having a hybrid feed approach. In some embodiments, the metasurface antenna with dual beam capabilities is feed with feed waves from a center-fed waveguide structure and an edge-fed waveguide structure. In some embodiments, the antenna comprises an array of radio-frequency (RF) radiating antenna elements and operable to generate two beams simultaneously in response to interacting with two propagating waves at a same time; and a feed structure coupled to feed the two waves to the array of RF radiating antenna elements, the feed structure having a first waveguide beneath the RF radiating antenna elements in which the two waves propagate in opposite directions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
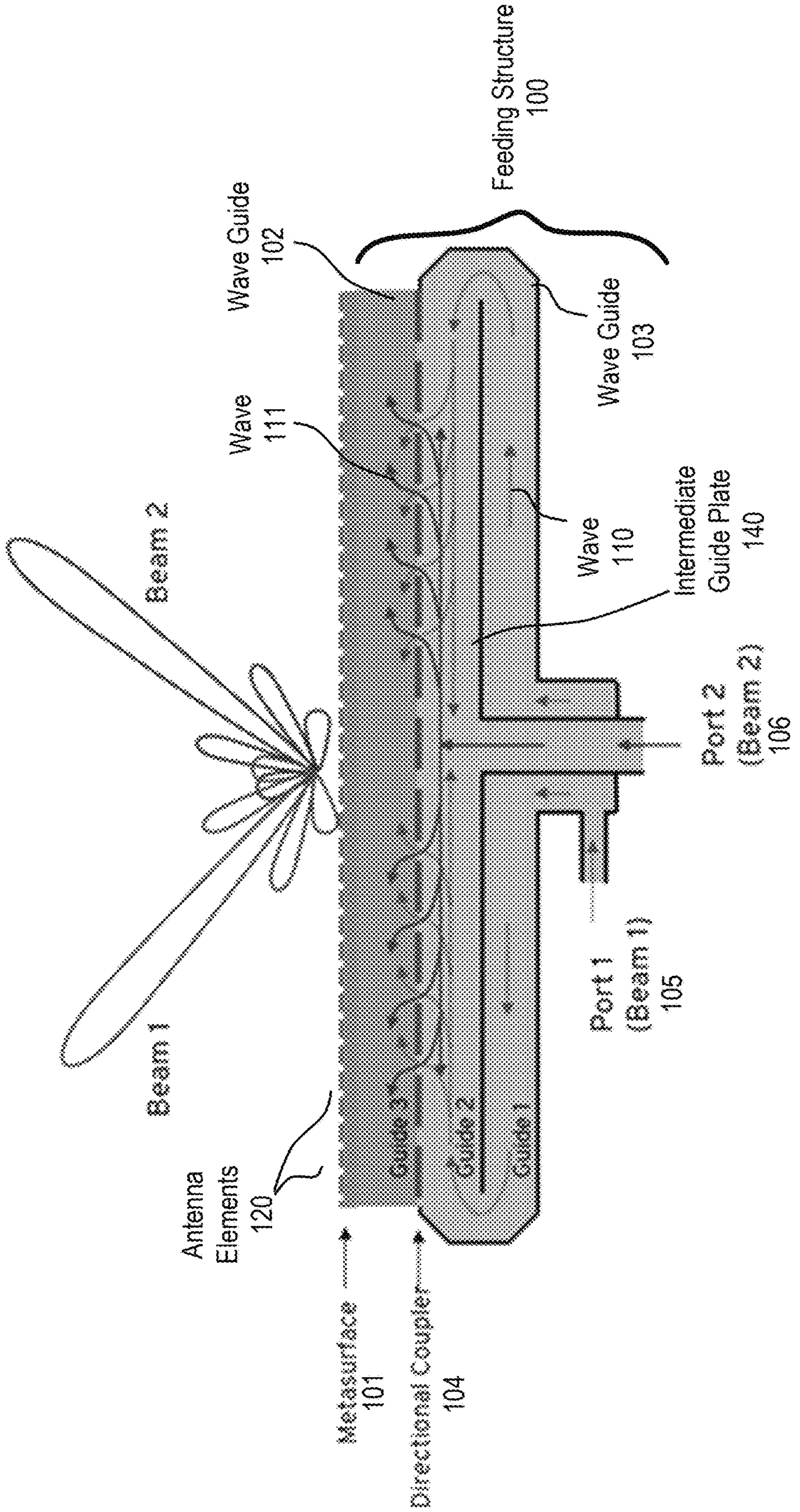
FIG. 1 illustrates a proposed antenna design for creation of two simultaneous beams with arbitrary directions or polarizations.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

An antenna having a hybrid feed and method for using the same are disclosed. In some embodiments, the antenna is fed with feed waves from a feeding structure that combines a center-fed waveguide structure with an edge-fed waveguide structure. In some embodiments, the feed waves are radial feed waves. In some embodiments the antenna aperture is part of a leaky wave antenna and has sub-wavelength radiating slots. In some embodiments, the antenna comprises a metasurface having a plurality of metamaterial antenna elements that radiate radio-frequency (RF) energy. Such antenna elements can be surface scattering metamaterial antenna elements. Examples of such antenna elements includes liquid crystal (LC)-tuned surface scattering metamaterial antenna elements, varactor-based metamaterial antenna elements in which one or more varactor diode is used for tuning the radiating slot antenna element, etc.

Embodiments disclosed herein include a metasurface antenna with dual beam capabilities, including the capability of receiving and transmitting simultaneously on two different, concurrent beams. The two beams can be communicably coupled to two different satellites.

In some embodiments, the antenna comprises a radiating metasurface and a feeding device that can feed the metasurface concurrently with two waves travelling in opposite directions. Examples of such metasurface devices with metamaterial antenna elements (e.g., surface scattering radio-frequency (RF) radiating metamaterial antenna elements, etc.) are discussed in greater detail below. These two waves will excite antenna elements that are located on the top of the radial waveguides. Due to the normality of the incoming and outgoing radial waves, the antenna elements can be tuned so that each wave will generate a beam with different beam pointing toward a different target. One advantage of this design is that it can give a very good level of isolation between the two channels while preserving the level of directivity and bandwidth for each beam.

In some embodiments, the metasurface antenna with capabilities to generate dual beams simultaneously is fed with feed waves from a center-fed waveguide structure and an edge-fed waveguide structure. Thus, the feed is a hybrid architecture that integrates both "center-fed" and "edge-fed" feeding mechanisms. In some embodiments, the two integrated feeding mechanisms propagate radial waves moving toward the center of a waveguide for one of the feeds and toward the edge of the waveguide for the other feed. The two waves interact with the metasurface that is placed on top of the feed structure and they create two beams with selectable directions and polarizations.

In some embodiments, the two beams are independent from each other in their pointing angles, such that the two beams are independent from each, embodiments of the antenna can be configured to send and receive data to two satellites simultaneously without losing the directivity or bandwidth. In some embodiments, the generation of two beams is controlled so the beams can have any arbitrary combination of polarizations and/or the two beams can have any arbitrary combination of frequency within the band of operation. This results in using the same aperture and antenna elements for creation of two beams with controllable directions and polarizations that are excited by the two input feeds. In some embodiments, the antenna receives two beams simultaneously and guides them to two separate ports at the back of the antenna with a minimum interference with each other.

Furthermore, in some embodiments, the antenna does not require any additional area footprint or antenna elements for the creation of the additional beam, thereby resulting in lower size and the required hardware for creating two concurrent beams. That is, the antenna design described herein achieves the simultaneous bidirectional connection to two satellites at arbitrary directions without the need to increase the aperture size or sacrificing the aperture efficiency or the bandwidth.

FIG. 1 illustrates a side section view of some embodiments of an antenna. The antenna can create two simultaneous beams with configurable beam directions and/or polarizations, such that beams with any desired directions and polarizations can be generated. The two beams are generated by the antenna using two feed waves injected into a feeding structure of the antenna which interact with RF radiating antenna elements of the antenna. The two injected feed waves propagate in opposite directions in at least one guide of the feeding structure that is below the antenna elements (which are positioned on the top of the feeding structure) and interact with the antenna elements to create two beams with adjustable directions and polarizations.

Referring to FIG. 1, metasurface 101 with antenna elements 120 is coupled to and on top of a feeding structure 100. As discussed herein, in some embodiments, antenna elements 120 may comprise, for example, sub-wavelength radiating slots, RF energy radiating antenna elements (e.g., surface scattering metamaterial (e.g., liquid-crystal (LC)-based antenna elements, varactor-based metamaterial antenna elements, etc.)), etc.

In some embodiments, feeding structure 100 comprises three layers of waveguides. The three layers, referred to herein as guides 1-3, are part of waveguides 102 and 103. Feeding structure 100 also comprises directional coupler 104 and ports 105 and 106, which are on the back of the antenna. Waveguide 102 is coupled to and below metasurface 101. Waveguide 102 is also on top of and coupled to waveguide 103. The two lower guides 1 and 2 of waveguide 103 are separated by an intermediate guide plate 140. In some embodiments, intermediate guide plate 140 comprises a metallic sheet.

Directional coupler 104 is coupled to and separates guides 3 and 2 of waveguides 102 and 103, respectively. Directional coupler 104 operates to provide the waves propagating in guide 3 more uniformly to antenna elements 120 (than if directional coupler 104 was not present). The use of directional coupler 104 in this manner is well-known in the art. In some embodiments, directional coupler 104 comprises a printed circuit board (PCB) substrate or other type of substrate with copper features on one side and acts to provide feed waves 110 and 111 to antenna elements 120 in a more uniform fashion. In some embodiments, the copper features are holes in the PCB.

Port 105 is connected to and provides a feed wave 110 to guide 1 of waveguide 103, while port 106 is connected to and provides a feed wave 111 to guide 2 of waveguide 103. Note that in some embodiments, feed waves 110 and 111 are radial waves and metasurface 101 and feeding structure 100 are cylindrical (when view from the top). By interacting with the waves 110 and 111, antenna elements 120 generate beam 1 and beam 2. In some embodiments, the distance, or height, of port 105 from guide 1 is selected to reduce, and potentially minimize, reflection that may result from injecting wave 110 into guide 1.

Edge-fed operation of feeding structure 100: In some embodiments, when wave 110 is inserted into port 105, wave 110 couples to guide 1 and travels radially outwards towards the outer edge in the form of a TEM mode. Once wave 110 arrives at the edge, the wave transitions into guide 2 and travels towards the center, and while it's travelling the wave couples power into guide 3 through directional coupler 104. This creates a wave in guide 3 that is travelling towards the center and interacts with antenna elements 120 of metasurface 101 to form a first beam referred to herein as beam 1.

Center-fed operation of feeding structure 100: In some embodiments, when a second wave 111 is inserted into the second port, port 106, wave 111 couples to guide 2 directly at the center of the antenna. Wave 111 travels outwards in guide 2 and while it's traveling it couples power into guide 3 through directional coupler 104 and travels in the opposite direction to that of wave 110. Like wave 110, wave 111 interacts with antenna elements 120 of metasurface 101 to create a second beam referred to herein as beam 2.

The description provided above for the edge-fed and center-fed operations illustrates the transmit mode. The receive mode operates in a similar manner. Due to the opposite travelling directions of the waves, a maximum isolation between the two beams can be obtained.

As shown in FIG. 1, the antenna generates two beams simultaneously. In some embodiments, the generation of the two beams occurs by applying modulation to the antenna elements. In some embodiments, the modulation applied to the antenna elements is a combination of the modulations for each of the beams. In some embodiments, the modulation applied to the antenna elements is the average of the required modulations for the creation of each beam, which results in two simultaneous beams being created with the selected directions and/or polarizations.

Figure 2:
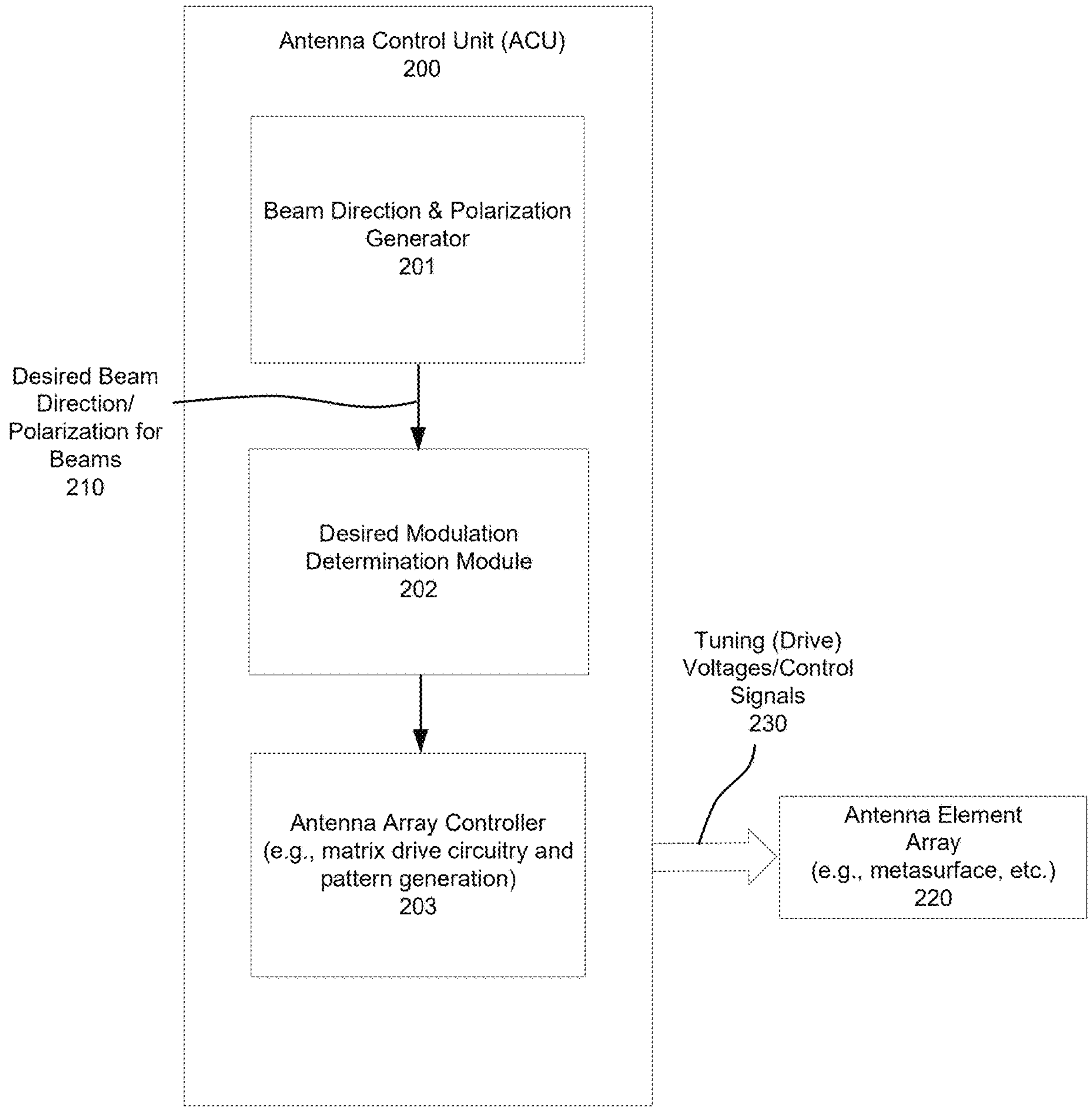
FIG. 2 illustrates some embodiments of an antenna control unit (ACU).

FIG. 2 illustrates some embodiments of an antenna control unit (ACU) that generates the modulation for the array of antenna elements. In some embodiments, the ACU comprises hardware (e.g., circuitry, dedicated logic, etc.), software (e.g., software running on a chip(s) or processor(s), etc.), firmware, or a combination of the three.

Referring to FIG. 2, a beam direction and polarization generator 201 of ACU 200 generates beam directions and polarizations (210) for the two beams and provides these to beam modulation determination module 202. In response, beam modulation determination module 202 generates the modulation for the antenna elements. In some embodiments, beam modulation determination module 202 generates the modulation by determining the modulation for each beam and then combining those two modulations into one modulation by, for example, averaging the two modulations.

An antenna array controller (e.g., matrix drive pattern generator) 203 of A CU 200 generates tuning (drive) voltages and control signals (230) that are sent to antenna elements in array 220 (e.g., antenna elements 120 of metasurface 101 of FIG. 1). Based on the tuning voltages and control signals (230), the antenna elements generate two beams simultaneously.

Figure 3:
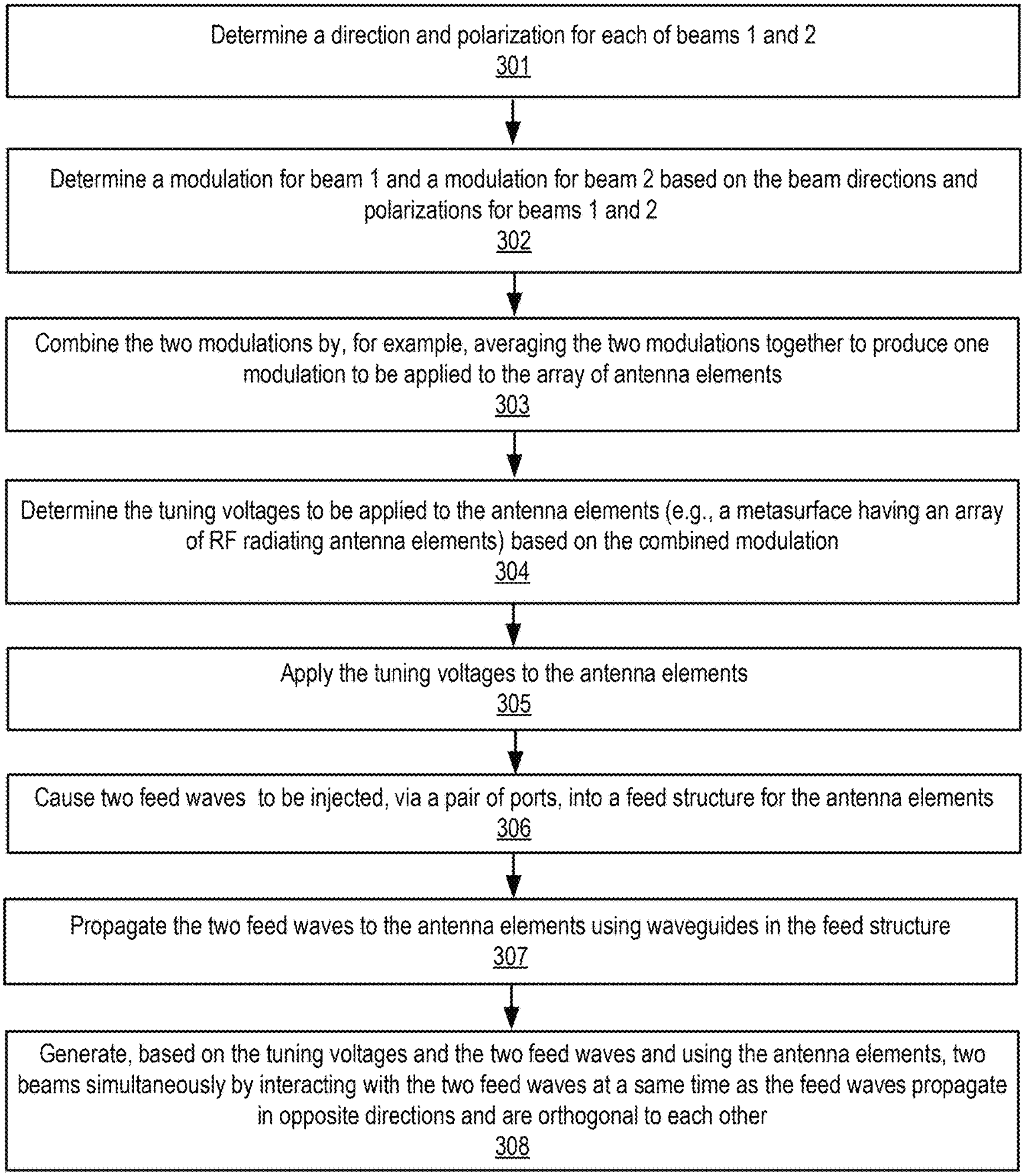
FIG. 3 is a flow diagram illustrating some embodiments of a process for generating two beams simultaneously with one antenna aperture.

FIG. 3 is a flow diagram illustrating some embodiments of a process for generating two beams simultaneously with one antenna aperture have antenna elements. The process is performed by processing logic that comprises hardware (e.g., circuitry, dedicated logic, etc.), software (e.g., software running on a chip(s) or processor(s), etc.), firmware, or a combination of the three.

Referring to FIG. 3, the process begins by processing logic determining a direction and polarization for each of beams 1 and 2 (processing block 301). Based on the beam directions and polarizations for beams 1 and 2, processing logic determines a modulation for beam 1 and a modulation for beam 2 (processing block 302). With the two modulations, processing logic combines them by, for example, averaging the two modulations together to produce one modulation to be applied to the array of antenna elements (processing block 303). Alternatively, processing logic can combine them using geometrical averaging.

Once the combined modulation has been created, processing logic determines the tuning voltages to be applied to the antenna elements (e.g., a metasurface having an array of RF radiating antenna elements) based on the combined modulation (processing block 304). In some embodiments, the process of generating the tuning voltages from the combined modulation comprises applying a Euclidean mapping to map a modulation to achievable modulation states as part of a Euclidean modulation process and then applying the corresponding tuning voltages based on those achievable states. For more information on Euclidean modulation, see U.S. Pat. No. 10,686,636, entitled "Restricted Euclidean modulation", issued Jun. 16, 2020. Once the tuning voltages for the antenna elements have been selected, processing logic applies the tuning voltages to the antenna elements (processing block 305).

Also, as part of the process, processing logic controls two feed waves and causes them to be injected, via a pair of ports, into a feed structure for the antenna elements (processing block 306). The feed waves propagate through the feeding structure using waveguides to reach the antenna elements (307). Based on the tuning voltages and the two feed waves, the antenna elements generate two beams simultaneously by interacting with the two feed waves at a same time (as the feed waves propagate in opposite directions) (308).

In some embodiments, the two feed waves that are propagating in opposite directions in the guides (e.g., guides 2 and 2 of FIG. 1) are orthogonal to each other (in terms of the integral of the product of functions over the surface vanishing). This leads to the fact that the two channels are isolated and provides the possibility to use the same aperture for the creation of the two beams. Note that this antenna design techniques makes it possible to reuse the same aperture footprint for the creation of the second beam and enable the creation of two beams without sacrificing bandwidth or aperture efficiency.

In some embodiments, the impedance of antenna elements can be tuned to be the average value required for the creation of the first beam and the second beam. Due to the orthonormality of the created waveforms traveling in opposite directions toward the center and the edge of the cylindrical waveguide in the feeding structure and the assigned value of the impedance for the antenna elements, the antenna creates two beams without sacrificing the bandwidth or the aperture efficiency.

Figure 4:
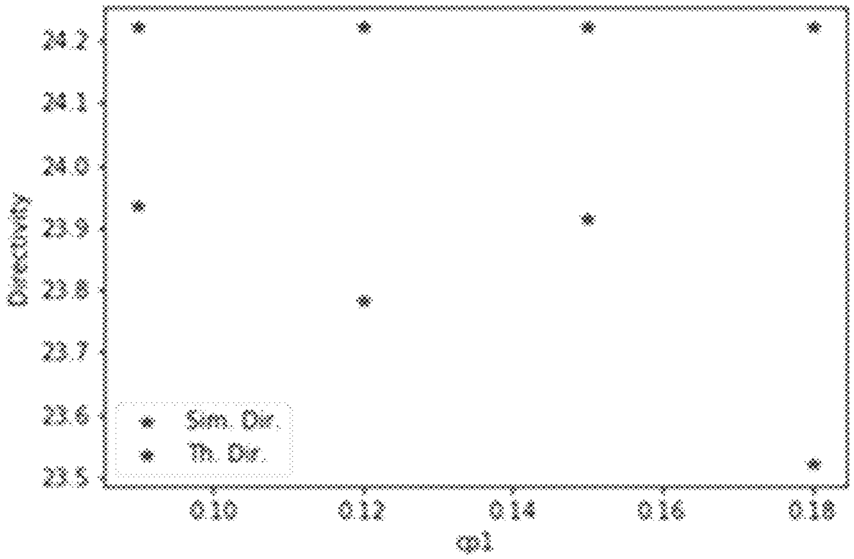
FIG. 4 illustrates the variation of the directivity with the cell pitch distance between the antenna elements at the chosen wavelength of 11 GHz.

In some embodiments, using the numerical modeling, the isolation between the two channels becomes negligible and the level of aperture efficiency reaches the theoretically achievable values by using the antenna elements that are positioned in subwavelength distances from each other. FIG. 4 shows that a similar amount of directivity as the one for a mono beam antenna using a similar number of antenna elements is achievable with this reported dual feed dual beam design. The variation of the directivity with the cell pitch distance between the antenna elements at a chosen wavelength of 11 GHz is depicted in FIG. 4. As shown in FIG. 4, the directivity reaches close to the theoretical limit by using a cell pitch distance of 0.15" or smaller, which means that close to the same level of aperture efficiency can be reached for the dual feed antenna embodiments described herein using a similar number of antenna elements as the one used for some single beam antennas.

Figure 5:
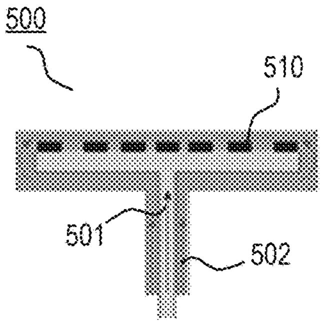
FIGS. 5-7 illustrate the three additional antenna embodiments that guide waves using a hybrid center-fed and edge-fed feeding structure.
Figure 6:
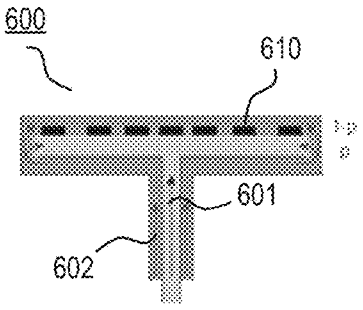
Figure 7:
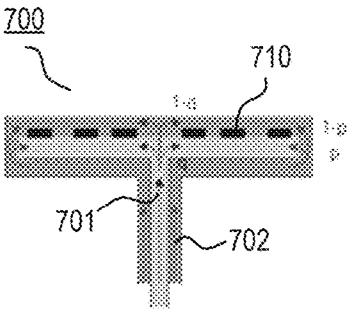

In addition to the antenna structure shown in FIG. 1, where the waves corresponding to the two feeds move in opposite directions in at least one waveguide, additional embodiments of using two feeds to supply two feed waves to antenna elements are shown in FIGS. 5-7. More specifically, FIGS. 5-7 illustrate three additional antenna embodiments for guiding the waves corresponding to the center-fed and edge-fed feeding structure. These antenna embodiments provide the ability to further tune the aperture distribution for each beam to get higher aperture efficiencies.

Referring to FIG. 5, a feeding structure 500 includes an edge-fed feeding structure to feed wave 502, a center-fed feeding structure to feed wave 501, and a directional coupler 510 in which edge fed wave 502 enters the top waveguide directly without entering the guide in which wave 501 propagates. In FIG. 6 or FIG. 7, the ratio of the power for the edge-fed or center-fed waves that moves toward the middle or top layer can be controlled. In some embodiments, the ratio is controlled by using a divider through control of the geometrical parameters. These embodiments provide further flexibility to tune the aperture distributions of the antenna for each beam and make them more uniform to enable reaching the maximum theoretical limits on the aperture efficiencies.

More specifically, FIG. 6 shows a feeding structure 600 that includes an edge-fed feeding structure to feed wave 602, a center-fed feeding structure to feed wave 601, and a directional coupler 610 in which a portion (1-*p*) of edge fed wave 602 enters the top waveguide above directional coupler 610 while another portion (p) of edge fed wave 602 enters the guide directly below directional coupler 610 (in which center-fed wave 601 propagates).

FIG. 7 shows a feeding structure 700 that includes an edge-fed feeding structure to feed wave 702, a center-fed feeding structure to feed wave 701, and a directional coupler 710. In this case, a portion (1-*p*) of edge fed wave 702 enters the top waveguide above directional coupler 710 while another portion (p) of edge fed wave 702 enters the guide in which wave 701 propagates. Similarly, a portion (1-*q*) of center-fed wave 701 enters the top waveguide above directional coupler 710 while another portion (q) of center-fed wave 701 enters the guide directly below directional coupler 710.

Embodiments disclosed herein can be used for the purpose of simultaneous connection to two satellites. In some embodiments, two cylindrical waveguides are used for guiding the input feeds and coupling them with the antenna elements located on the top. By controlling impedances of the antenna elements, the direction and the polarization of the beams can be controlled independently.

An advantage of one embodiment of antenna embodiments disclosed herein is that it comprises two waveguides for the propagation of the injected feeds and then creates two beams with selectable polarizations by directing them toward different directions. Moreover, embodiments of antennas described herein do not lead a decrease in the aperture efficiency or bandwidth.

Examples of Antenna Embodiments

The techniques described above may be used with flat panel satellite antennas. Embodiments of such flat panel antennas are disclosed. The flat panel antennas include one or more arrays of antenna elements on an antenna aperture. In some embodiments, the antenna aperture is a metasurface antenna aperture, such as, for example, the antenna apertures described below. In some embodiments, the antenna elements comprise diodes and varactors such as, for example, described above and described in U.S. Patent Application Publication No. 20210050671, entitled "Metasurface Antennas Manufactured with Mass Transfer Technologies," published Feb. 18, 2021. In other embodiments, the antenna elements comprises LC-based antenna elements, such as, for example, those disclosed in U.S. Pat. No. 9,887,456, entitled "Dynamic polarization and coupling control from a steerable cylindrically fed holographic antenna", issued Feb. 6, 2018, or other RF radiating antenna elements. In some embodiments, the flat panel antenna is a cylindrically fed antenna that includes matrix drive circuitry to uniquely address and drive each of the antenna elements that are not placed in rows and columns. In some embodiments, the elements are placed in rings.

In some embodiments, the antenna aperture having the one or more arrays of antenna elements is comprised of multiple segments coupled together. When coupled together, the combination of the segments form closed concentric rings of antenna elements. In some embodiments, the concentric rings are concentric with respect to the antenna feed.

Figure 8:
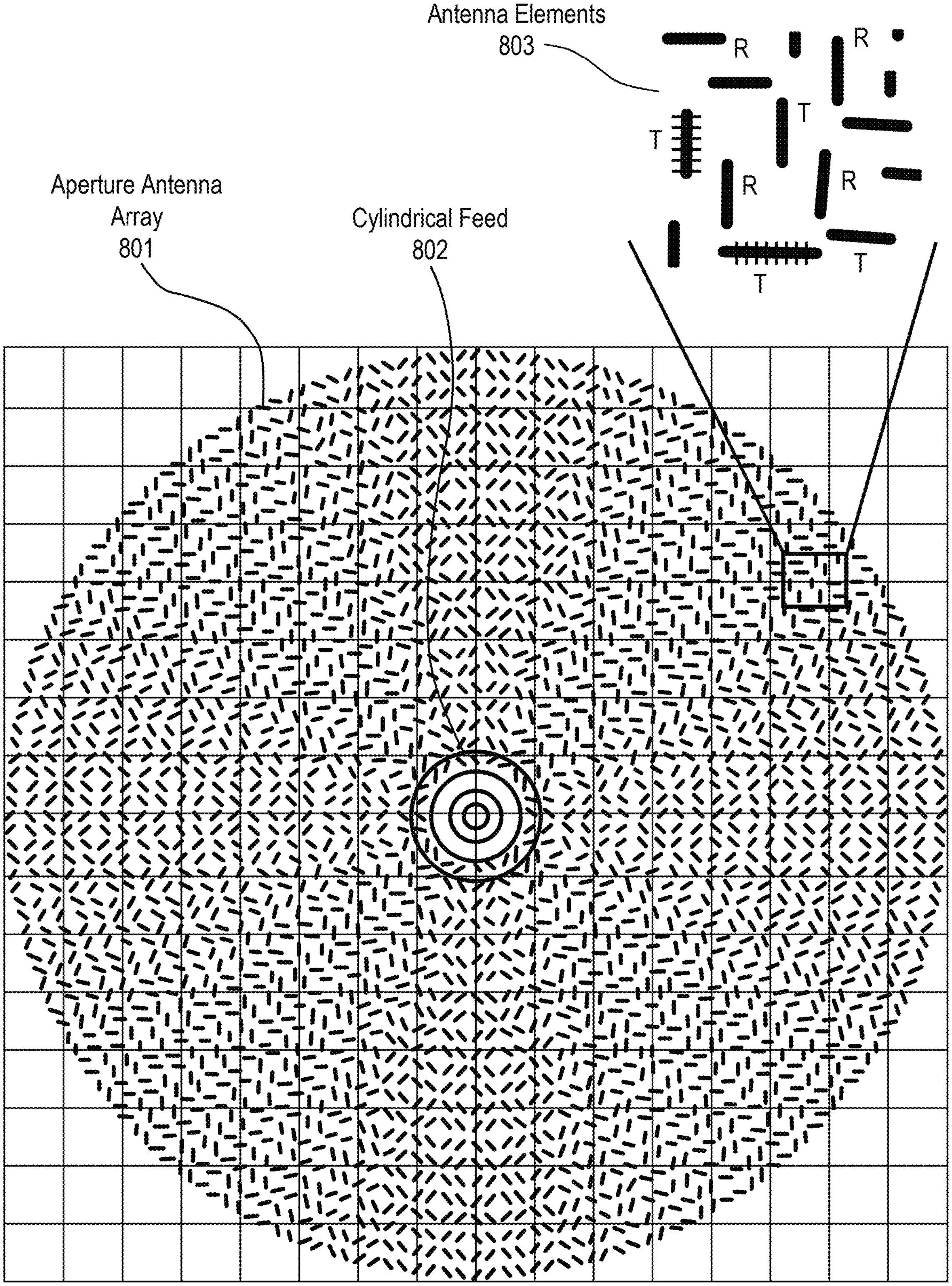
FIG. 8 illustrates the schematic of one embodiment of a cylindrically fed holographic radial aperture antenna.

FIG. 8 illustrates the schematic of one embodiment of a cylindrically fed holographic radial aperture antenna. Referring to FIG. 8, the antenna aperture has one or more arrays 801 of antenna elements 803 that are placed in concentric rings around an input feed 802 of the cylindrically fed antenna. In some embodiments, antenna elements 803 are radio frequency (RF) resonators that radiate RF energy. In some embodiments, antenna elements 803 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In some embodiments, the antenna includes a coaxial feed that is used to provide a cylindrical wave feed via input feed 802. In some embodiments, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In some embodiments, antenna elements 803 comprise irises (iris openings) and the aperture antenna of FIG. 8 is used to generate a main beam shaped by using excitation from a cylindrical feed wave for radiating the iris openings through tunable diodes and/or varactors. In some embodiments, the antenna can be excited to radiate a horizontally or vertically polarized electric field at desired scan angles.

In some embodiments, each scattering element in the antenna system is part of a unit cell as described above. In some embodiments, the unit cell is driven by the direct drive embodiments described above. In some embodiments, the diode/varactor in each unit cell has a lower conductor associated with an iris slot from an upper conductor associated with its tuning electrode (e.g., iris metal). The diode/varactor can be controlled to adjust the bias voltage between the iris opening and the patch electrode. Using this property, in some embodiments, the diode/varactor integrates an on/off switch for the transmission of energy from the guided wave to the unit cell. When switched on, the unit emits an electromagnetic wave like an electrically small dipole antenna. Note that the teachings herein are not limited to having unit cell that operates in a binary fashion with respect to energy transmission.

In some embodiments, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In some embodiments, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In some embodiments, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch electrode using a controller. Traces to each patch electrode are used to provide the voltage to the patch electrode. The voltage is used to tune or detune the capacitance and thus the resonance frequency of individual elements to effectuate beam forming. The voltage required is dependent on the diode/varactor being used.

In some embodiments, as discussed above, a matrix drive is used to apply voltage to the patch electrodes in order to drive each cell separately from all the other cells without having a separate connection for each cell (direct drive). Because of the high density of elements, the matrix drive is an efficient way to address each cell individually.

In some embodiments, the control structure for the antenna system has two main components: the antenna array controller, which includes drive electronics for the antenna system, is below the wave scattering structure of surface scattering antenna elements such as described herein, while the matrix drive switching array is interspersed throughout the radiating RF array in such a way as to not interfere with the radiation. In some embodiments, the drive electronics for the antenna system comprise commercial off-the shelf LCD controls used in commercial television appliances that adjust the bias voltage for each scattering element by adjusting the amplitude or duty cycle of an AC bias signal to that element.

In some embodiments, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In some embodiments, multistate control is used in which various elements are turned on and off to varying levels, further approximating a sinusoidal control pattern, as opposed to a square wave (i.e., a sinusoid gray shade modulation pattern). In some embodiments, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space, and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In some embodiments, the antenna system produces one steerable beam for the uplink antenna and one steerable beam for the downlink antenna. In some embodiments, the antenna system uses metamaterial technology to receive beams and to decode signals from the satellite and to form transmit beams that are directed toward the satellite. In some embodiments, the antenna systems are analog systems, in contrast to antenna systems that employ digital signal processing to electrically form and steer beams (such as phased array antennas). In some embodiments, the antenna system is considered a "surface" antenna that is planar and relatively low profile, especially when compared to conventional satellite dish receivers.

Figure 9A:
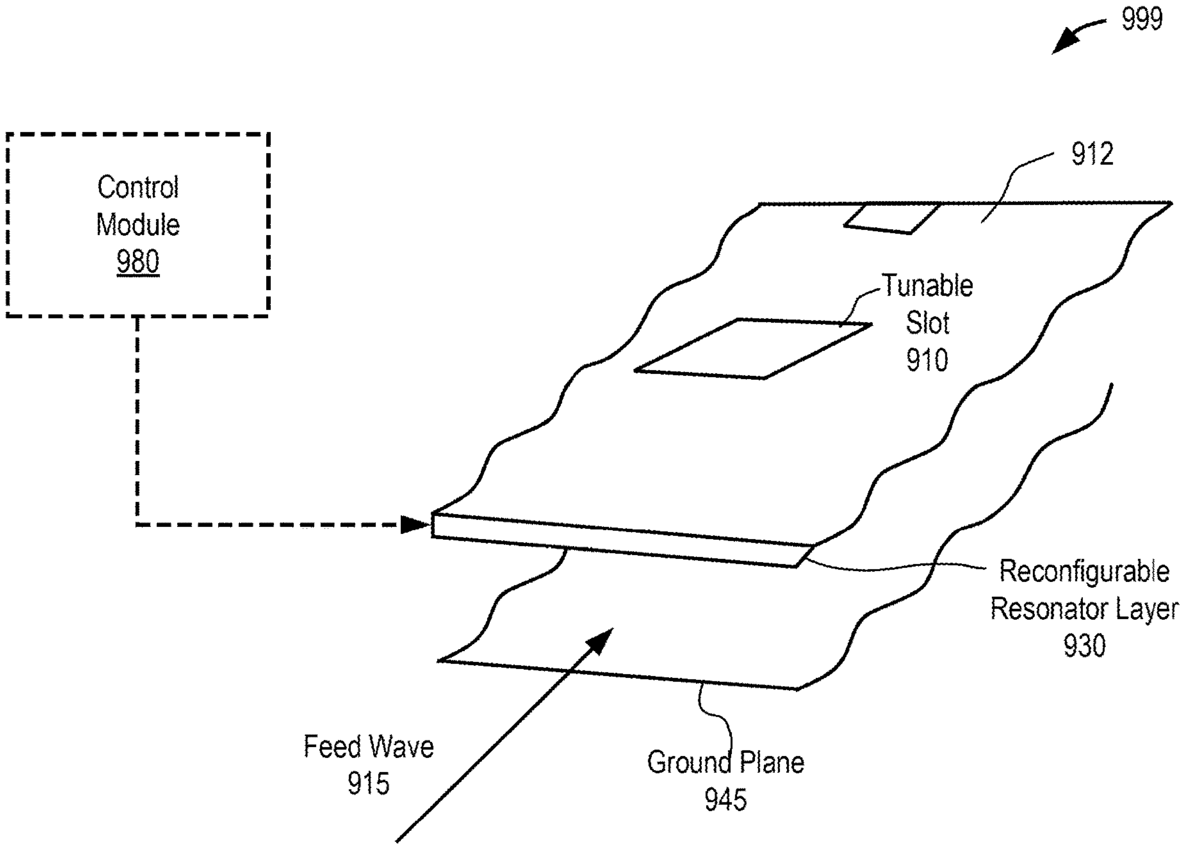
FIG. 9A illustrates a perspective view 999 of one row of antenna elements that includes a ground plane and a reconfigurable resonator layer.

FIG. 9A illustrates a perspective view 999 of one row of antenna elements that includes a ground plane 945 and a reconfigurable resonator layer 930. Reconfigurable resonator layer 930 includes an array 912 of tunable slots 910. The array 912 of tunable slots 910 can be configured to point the antenna in a desired direction. Each of the tunable slots 910 can be tuned/adjusted by varying a voltage, which changes the capacitance of the varactor diode and results in a frequency shift, which in turn changes the amplitude and phase of the radiating antenna element. A proper phase and amplitude adjustment of the antenna elements in an array will result in a beam formation and beam steering.

Control module 980, or a controller, is coupled to reconfigurable resonator layer 930 to modulate the array 912 of tunable slots 910 by varying the voltage to the diodes/varactors. Control module 980 may include a Field Programmable Gate Array ("FPGA"), a microprocessor, a controller, System-on-a-Chip (SoC), or other processing logic. In some embodiments, control module 980 includes logic circuitry (e.g., multiplexer) to drive the array 912 of tunable slots 910. In some embodiments, control module 980 receives data that includes specifications for a holographic diffraction pattern to be driven onto the array 912 of tunable slots 910. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 980 may drive each array of tunable slots described in various embodiments in the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 915 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 910 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $$w_{hologram} = w_{in}^{*} w_{out},$$

with $w_{in}$ as the wave equation in the waveguide and $w_{out}$ the wave equation on the outgoing wave.

A voltage between the patch electrode and the iris opening can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy radiated from feed wave 915 propagating through the waveguide. As an example, if feed wave 915 is 20 GHz, the resonant frequency of a slot 910 may be adjusted (by varying the capacitance) to 17 GHz so that the slot 910 couples substantially no energy from feed wave 915. Or, the resonant frequency of a slot 910 may be adjusted to 20 GHz so that the slot 910 couples energy from feed wave 915 and radiates that energy into free space. Although the examples given are binary (fully radiating or not radiating at all), full gray scale control of the reactance, and therefore the resonant frequency of slot 910 is possible with voltage variance over a multi-valued range. Hence, the energy radiated from each slot 910 can be finely controlled so that detailed holographic diffraction patterns can be formed by the array of tunable slots.

In some embodiments, tunable slots in a row are spaced from each other by λ/5. Other spacings may be used. In some embodiments, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Figure 9B:
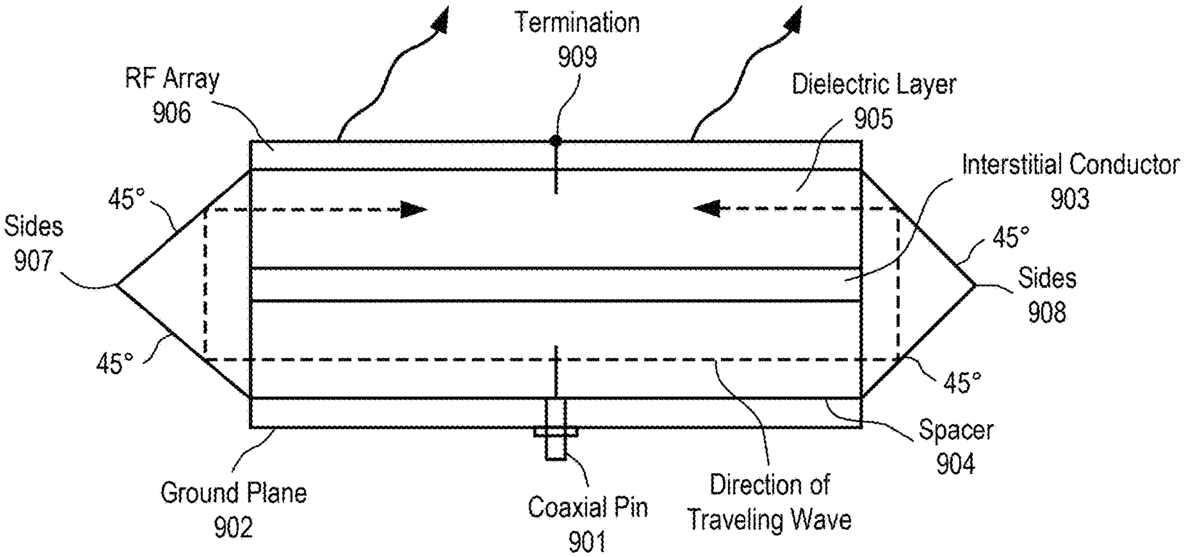
FIG. 9B illustrates a side view of one embodiment of a cylindrically fed antenna structure.

FIG. 9B illustrates a side view of one embodiment of a cylindrically fed antenna structure. The antenna produces an inwardly travelling wave using a double layer feed structure (i.e., two layers of a feed structure). In some embodiments, the antenna includes a circular outer shape, though this is not required. That is, non-circular inward travelling structures can be used. In some embodiments, the antenna structure in FIG. 9B includes a coaxial feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Patent Application Publication No. 20210050671, entitled "Metasurface Antennas Manufactured with Mass Transfer Technologies," published Feb. 18, 2021.

Referring to FIG. 9B, a coaxial pin 901 is used to excite the field on the lower level of the antenna. In some embodiments, coaxial pin 901 is a 50 Ω coax pin that is readily available. Coaxial pin 901 is coupled (e.g., bolted) to the bottom of the antenna structure, which is conducting ground plane 902.

Separate from conducting ground plane 902 is interstitial conductor 903, which is an internal conductor. In some embodiments, conducting ground plane 902 and interstitial conductor 903 are parallel to each other. In some embodiments, the distance between ground plane 902 and interstitial conductor 903 is 0.1-0.15". In another embodiment, this distance may be λ/2, where λ is the wavelength of the travelling wave at the frequency of operation.

Ground plane 902 is separated from interstitial conductor 903 via a spacer 904. In some embodiments, spacer 904 is a foam or air-like spacer. In some embodiments, spacer 904 comprises a plastic spacer.

On top of interstitial conductor 903 is dielectric layer 905. In some embodiments, dielectric layer 905 is plastic. The purpose of dielectric layer 905 is to slow the travelling wave relative to free space velocity. In some embodiments, dielectric layer 905 slows the travelling wave by 30% relative to free space. In some embodiments, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric layer 905, such as periodic sub-wavelength metallic structures that can be machined or lithographically defined, for example.

An RF array 906 is on top of dielectric layer 905. In some embodiments, the distance between interstitial conductor 903 and RF array 906 is 0.1-0.15". In another embodiment, this distance may be $\lambda_{eff}/2$, where $\lambda_{eff}$ is the effective wavelength in the medium at the design frequency.

The antenna includes sides 907 and 908. Sides 907 and 908 are angled to cause a travelling wave feed from coax pin 901 to be propagated from the area below interstitial conductor 903 (the spacer layer) to the area above interstitial conductor 903 (the dielectric layer) via reflection. In some embodiments, the angle of sides 907 and 908 are at 45° angles. In an alternative embodiment, sides 907 and 908 could be replaced with a continuous radius to achieve the reflection. While FIG. 9B shows angled sides that have angle of 45 degrees, other angles that accomplish signal transmission from lower-level feed to upper-level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 901, the wave travels outward concentrically oriented from coaxial pin 901 in the area between ground plane 902 and interstitial conductor 903. The concentrically outgoing waves are reflected by sides 907 and 908 and travel inwardly in the area between interstitial conductor 903 and RF array 906. The reflection from the edge of the circular perimeter causes the wave to remain in phase (i.e., it is an in-phase reflection). The travelling wave is slowed by dielectric layer 905. At this point, the travelling wave starts interacting and exciting with elements in RF array 906 to obtain the desired scattering.

To terminate the travelling wave, a termination 909 is included in the antenna at the geometric center of the antenna. In some embodiments, termination 909 comprises a pin termination (e.g., a 50 Ω pin). In another embodiment, termination 909 comprises an RF absorber that terminates unused energy to prevent reflections of that unused energy back through the feed structure of the antenna. These could be used at the top of RF array 906.

Figure 10:
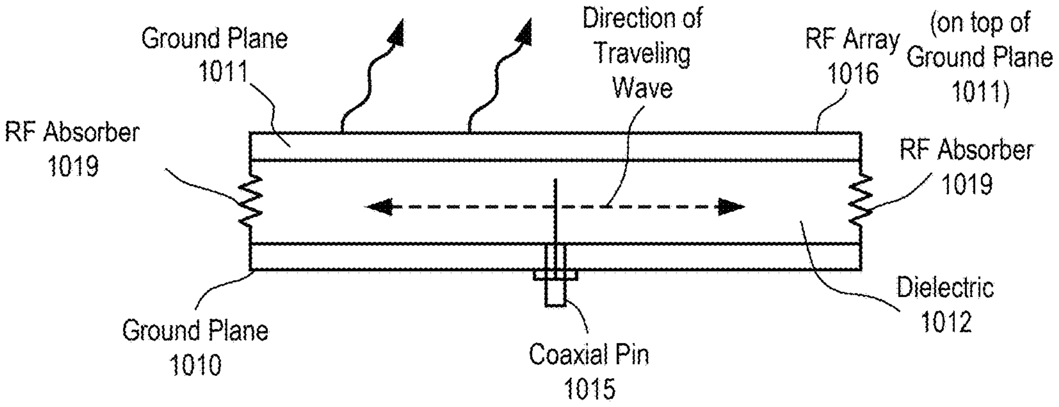
FIG. 10 illustrates another embodiment of the antenna system with an outgoing wave.

FIG. 10 illustrates another embodiment of the antenna system with an outgoing wave. Referring to FIG. 10, two ground planes 1010 and 1011 are substantially parallel to each other with a dielectric layer 1012 (e.g., a plastic layer, etc.) in between ground planes 1010, 1011. RF absorbers 1019 (e.g., resistors) couple the two ground planes 1010 and 1011 together. A coaxial pin 1015 (e.g., 50Ω) feeds the antenna. An RF array 1016 is on top of dielectric layer 1012 and ground plane 1011.

In operation, a feed wave is fed through coaxial pin 1015 and travels concentrically outward and interacts with the elements of RF array 1016.

The cylindrical feed in both the antennas of FIGS. 9B and 10 improves the service angle of the antenna. Instead of a service angle of plus or minus forty-five degrees azimuth (±45° Az) and plus or minus twenty-five degrees elevation (±25° El), In some embodiments, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 906 of FIG. 9B and RF array 1016 of FIG. 10 include a wave scattering subsystem that includes a group of patch antennas (e.g., scatterers) that act as radiators. This group of patch antennas comprises an array of scattering metamaterial elements.

In some embodiments, the cylindrical feed geometry of this antenna system allows the unit cells elements to be positioned at forty-five-degree (45°) angles to the vector of the wave in the wave feed. This position of the elements enables control of the polarization of the free space wave generated from or received by the elements. In some embodiments, the unit cells are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

Cell Placement

Figure 11:
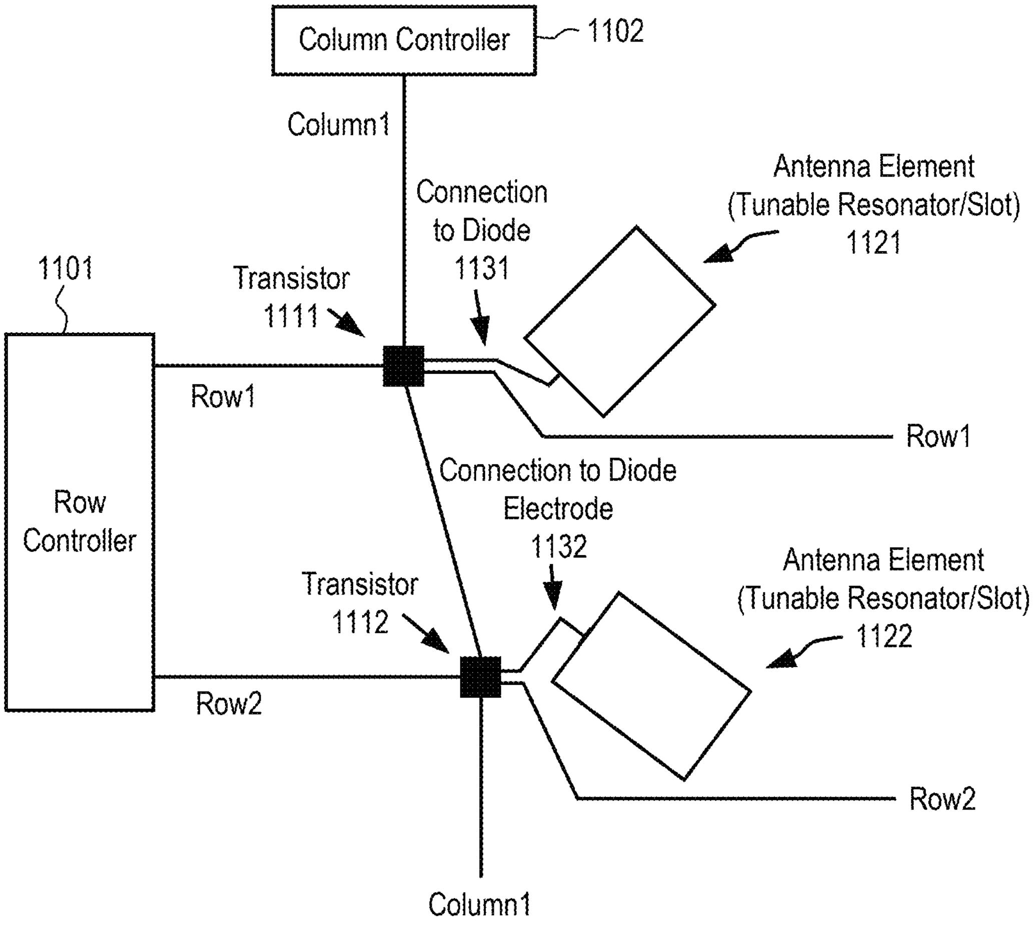
FIG. 11 illustrates one embodiment of the placement of matrix drive circuitry with respect to antenna elements.

In some embodiments, the antenna elements are placed on the cylindrical feed antenna aperture in a way that allows for a systematic matrix drive circuit. The placement of the cells includes placement of the transistors for the matrix drive. FIG. 11 illustrates one embodiment of the placement of matrix drive circuitry with respect to antenna elements. Referring to FIG. 11, row controller 1101 is coupled to transistors 1111 and 1112, via row select signals Row1 and Row2, respectively, and column controller 1102 is coupled to transistors 1111 and 1112 via column select signal Column1. Transistor 1111 is also coupled to antenna element 1121 via connection to diode 1131, while transistor 1112 is coupled to antenna element 1122 via connection to diode 1132.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In some embodiments, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 12:
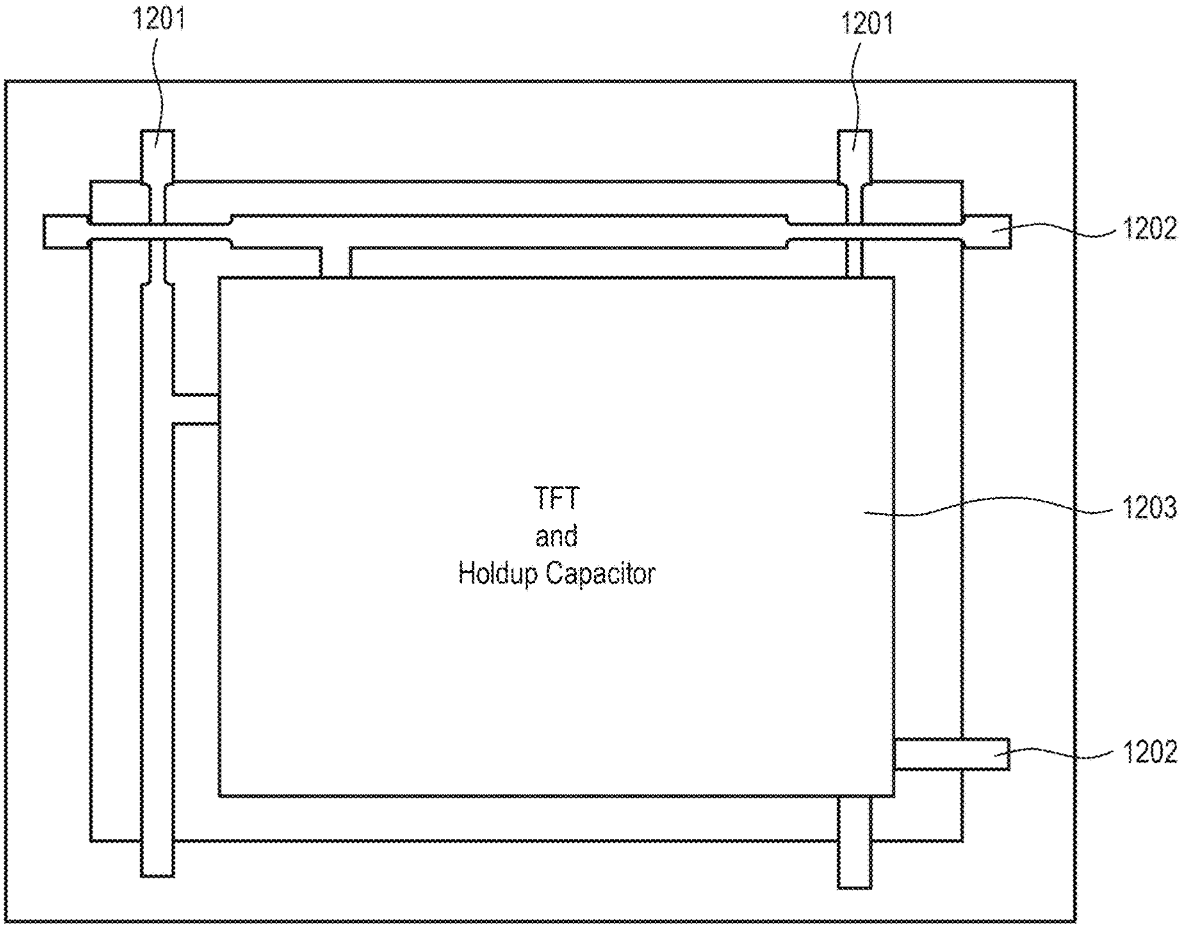
FIG. 12 illustrates one embodiment of a TFT package.

In some embodiments, a TFT package is used to enable placement and unique addressing in the matrix drive. FIG. 12 illustrates one embodiment of a TFT package. Referring to FIG. 12, a TFT and a hold capacitor 1203 is shown with input and output ports. There are two input ports connected to traces 1201 and two output ports connected to traces 1202 to connect the TFTs together using the rows and columns. In some embodiments, the row and column traces cross in 90° angles to reduce, and potentially minimize, the coupling between the row and column traces. In some embodiments, the row and column traces are on different layers.

An Example of a Full Duplex Communication System

Figure 13:
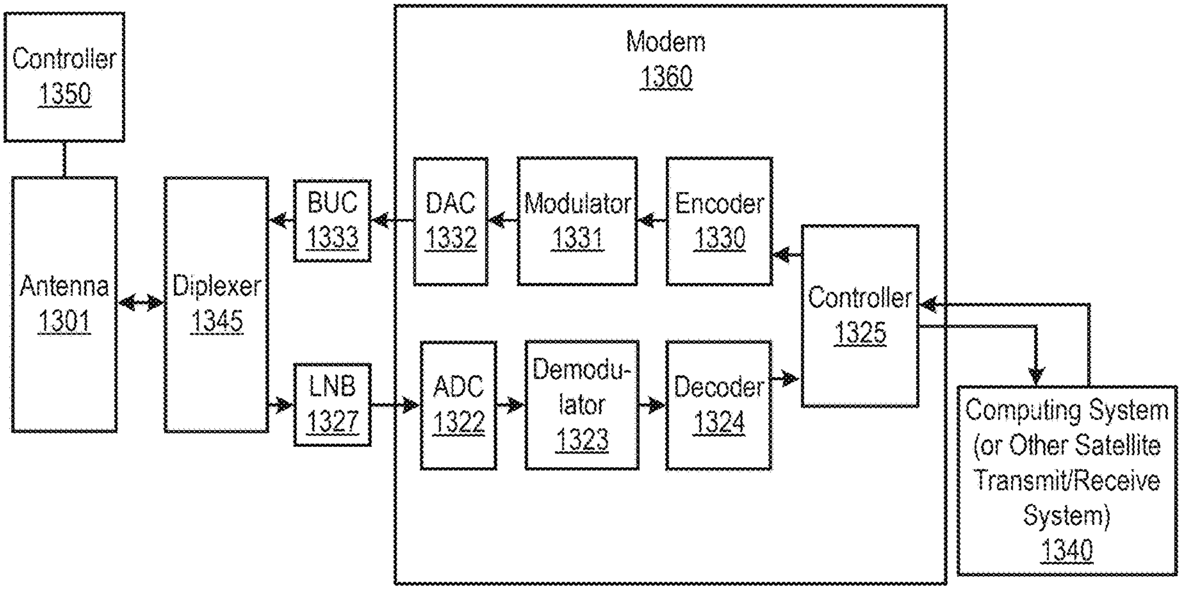
FIG. 13 is a block diagram of one embodiment of a communication system having simultaneous transmit and receive paths.

In another embodiment, the combined antenna apertures are used in a full duplex communication system. FIG. 13 is a block diagram of an embodiment of a communication system having simultaneous transmit and receive paths. While only one transmit path and one receive path are shown, the communication system may include more than one transmit path and/or more than one receive path.

Referring to FIG. 13, antenna 1301 includes two spatially interleaved antenna arrays operable independently to transmit and receive simultaneously at different frequencies as described above. In some embodiments, antenna 1301 is coupled to diplexer 1345. The coupling may be by one or more feeding networks. In some embodiments, in the case of a radial feed antenna, diplexer 1345 combines the two signals and the connection between antenna 1301 and diplexer 1345 is a single broad-band feeding network that can carry both frequencies.

Diplexer 1345 is coupled to a low noise block down converter (LNB) 1327, which performs a noise filtering function and a down conversion and amplification function in a manner well-known in the art. In some embodiments, LNB 1327 is in an out-door unit (ODU). In another embodiment, LNB 1327 is integrated into the antenna apparatus. LNB 1327 is coupled to a modem 1360, which is coupled to computing system 1340 (e.g., a computer system, modem, etc.).

Modem 1360 includes an analog-to-digital converter (ADC) 1322, which is coupled to LNB 1327, to convert the received signal output from diplexer 1345 into digital format. Once converted to digital format, the signal is demodulated by demodulator 1323 and decoded by decoder 1324 to obtain the encoded data on the received wave. The decoded data is then sent to controller 1325, which sends it to computing system 1340.

Modem 1360 also includes an encoder 1330 that encodes data to be transmitted from computing system 1340. The encoded data is modulated by modulator 1331 and then converted to analog by digital-to-analog converter (DAC) 1332. The analog signal is then filtered by a BUC (up-convert and high pass amplifier) 1333 and provided to one port of diplexer 1345. In some embodiments, BUC 1333 is in an out-door unit (ODU).

Diplexer 1345 operating in a manner well-known in the art provides the transmit signal to antenna 1301 for transmission.

Controller 1350 controls antenna 1301, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 13 has a number of applications, including but not limited to, internet communication, vehicle communication (including software updating), etc.

With reference to FIGS. 1-13, it should be appreciated that other tunable capacitors, tunable capacitance dies, packaged dies, micro-electromechanical systems (MEMS) devices, or other tunable capacitance devices, could be placed into an aperture or elsewhere in variations on the embodiments described herein, for further embodiments. The techniques for mass transfer may be applicable to further embodiments, including placement of various dies, packaged dies or MEMS devices on various substrates for electronically scanned arrays and various further electrical, electronic and electromechanical devices.

There are a number of example embodiments described herein.

Example 1 is an antenna comprising: an array of radio-frequency (RF) radiating antenna elements and operable to generate two beams simultaneously in response to interacting with two propagating waves at a same time; and a feed structure coupled to feed the two waves to the array of RF radiating antenna elements, the feed structure having a first waveguide beneath the RF radiating antenna elements in which the two waves propagate in opposite directions.

Example 2 is the antenna of example 1 that may optionally include that the array is part of a metasurface.

Example 3 is the antenna of example 1 that may optionally include that the array is operable to receive and transmit simultaneously on the two beams.

Example 4 is the antenna of example 1 that may optionally include that the feed structure comprises: a center-fed and edge-feed feeding mechanism that share a second waveguide in which the two waves propagate in opposite directions; and a pair of ports configured to inject the two waves into the center-fed and edge-feed feeding mechanism.

Example 5 is the antenna of example 4 that may optionally include that the first waveguide is between the array of antenna elements and the second waveguide.

Example 6 is the antenna of example 5 that may optionally include a directional coupler coupled between the first and second waveguides.

Example 7 is the antenna of example 1 that may optionally include that the feed structure comprises: three waveguides that form a stack with first and second waveguides being beneath the third waveguide and separated by a guide plate, the second and third waveguides separated by a directional coupler; and first and second ports configured to inject the two waves comprising first and second waves into the first and second waveguides, respectively, the first wave propagating outwardly through the first waveguide and then up and into the second waveguide at outer edges of the first and second waveguides to travel toward a central location in the second waveguide, the second wave propagating outward from the central location in the second guide in an opposite direction of the first wave, the first and second waves entering the third waveguide through the directional coupler and propagating in opposite directions in the third waveguide.

Example 8 is the antenna of example 1 that may optionally include a controller coupled to control the array of RF radiating antenna elements to tune RF radiating antenna elements to control the two beams independently of each other.

Example 9 is the antenna of example 1 that may optionally include that the controller is operable to control the two beams to have one or more of different pointing directions, different polarizations and different frequency.

Example 10 is the antenna of example 1 that may optionally include that the controller is operable to apply a modulation that is the average of the required modulation for the creation of each beam of the two beams.

Example 11 is an antenna comprising: a metasurface having an array of radio-frequency (RF) radiating antenna elements and operable to generate two beams simultaneously by interacting with two propagating waves at a same time; a feed structure coupled to feed the two waves to the array of RF radiating antenna elements, the feed structure having a first waveguide beneath the RF radiating antenna elements in which the two waves propagate in opposite directions and are orthogonal to each other; and a controller coupled to control the metasurface to tune RF radiating antenna elements to control the two beams independently of each other, wherein the controller is operable to control the two beams to have one or more of different pointing directions, different polarizations and different frequency.

Example 12 is the antenna of example 11 that may optionally include that the controller is operable to apply a modulation that is the average of the required modulation for the creation of each beam of the two beams.

Example 13 is the antenna of example 11 that may optionally include that the array is operable to receive and transmit simultaneously on the two beams.

Example 14 is the antenna of example 11 that may optionally include that the feed structure comprises: a center-fed and edge-feed feeding mechanism that share a second waveguide in which the two waves propagate in opposite directions; and a pair of ports configured to inject the two waves into the center-fed and edge-feed feeding mechanism.

Example 15 is the antenna of example 14 that may optionally include that the first waveguide is between the array of antenna elements and the second waveguide.

Example 16 is the antenna of example 15 that may optionally include that a directional coupler coupled between the first and second waveguides.

Example 17 is the antenna of example 16 that may optionally include that the edge-feed feeding mechanism is configured to enable a portion of one of the two waves to enter the first waveguide above the directional coupler while another portion the one feed wave enters the second waveguide.

Example 18 is the antenna of example 17 that may optionally include that the center-feed feeding mechanism is configured to enable a portion of a second of the two waves to enter the first waveguide above the directional coupler while another portion the second feed wave enters the second waveguide.

Example 19 is the antenna of example 11 that may optionally include that the feed structure comprises: three waveguides that form a stack with first and second waveguide being beneath the third waveguide and separated by a guide plate, the second and third waveguides separated by a directional coupler; and first and second ports configured to inject the two waves comprising first and second waves into the first and second waveguides, respectively, the first wave propagating outwardly through the first waveguide and then up and into the second waveguide at outer edges of the first and second waveguides to travel toward a central location in the second waveguide, the second wave propagating outward from the central location in the second guide in an opposite direction of the first wave, the first and second waves entering the third waveguide through the directional coupler and propagating in opposite directions in the third waveguide.

Example 20 is a method comprising: injecting, via a pair of ports, two feed waves into a feed structure; propagating the two feed waves using waveguides in the feed structure; and generating, using a metasurface having an array of radio-frequency (RF) radiating antenna elements, two beams simultaneously by interacting with the two feed waves at a same time as the feed waves propagate in opposite directions and are orthogonal to each other.

Example 21 is the method of example 20 that may optionally include that the feed structure comprises a center-fed and edge-feed feeding mechanism that share a second waveguide in which the two waves propagate in opposite directions, and wherein injecting, via a pair of ports, two feed waves into a feed structure comprises injecting first and second waves into the first and second waveguides, respectively, and wherein propagating the two feed waves using waveguides in the feed structure comprises propagating the first wave outwardly through the first waveguide and then up and into the second waveguide at outer edges of the first and second waveguides to travel toward a central location in the second waveguide, propagating the second wave outward from the central location in the second guide in an opposite direction of the first wave, and propagating the first and second waves into the third waveguide from the second waveguide using a directional coupler, and propagating the first and second waves in opposite directions in the third waveguide.

Example 22 is the method of example 20 that may optionally include applying modulation that is the average of the required modulation for the creation of each beam of the two beams.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an A SIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. An antenna comprising:

a metasurface having an array of radio-frequency (RF) radiating antenna elements and operable to generate two beams simultaneously in response to interacting with two propagating waves at a same time; and a feed structure coupled to feed the two waves to the array of RF radiating antenna elements, the feed structure has a plurality of waveguides, wherein at least one of the waveguides being beneath the RF radiating antenna elements, wherein the feed structure comprises a center-fed and edge-feed feeding mechanism that share at least one waveguide of the plurality of waveguides in which the two waves propagate in opposite directions and are orthogonal to each other, and a pair of ports configured to inject the two waves into the center-fed and edge-feed feeding mechanism;

a directional coupler coupled between first and second waveguides of the plurality of waveguides, the first waveguide being between the directional coupler and the metasurface and the second waveguide being on an opposite side of the directional coupler from the first waveguide, wherein the edge-feed feeding mechanism is configured to provide a first wave of the two waves to the first waveguide and to the second waveguide simultaneously, and wherein the center-feed feeding mechanism is configured to provide a second wave of the two waves to the first waveguide above the directional coupler and to the second waveguide simultaneously.

2. The antenna of claim 1 further comprising a controller coupled to the metasurface to tune the RF radiating antenna elements to control the two beams independently of each other.

3. The antenna of claim 2 wherein the controller is operable to control the two beams to have one or more of different pointing directions, different polarizations and different frequency.

4. The antenna of claim 2 wherein the controller is operable to apply a modulation that is the average of the required modulation for the creation of each beam of the two beams.

5. The antenna of claim 2 wherein the array is operable to receive and transmit simultaneously on the two beams.

6. The antenna of claim 1 further comprising a divider to control a ratio of power between the first and second waves.

7. An antenna comprising:

a metasurface having an array of radio-frequency (RF) radiating antenna elements and operable to generate two beams simultaneously in response to interacting with two propagating waves at a same time; and a feed structure coupled to feed the two waves to the array of RF radiating antenna elements, the feed structure has a plurality of waveguides, wherein at least one of the waveguides being beneath the RF radiating antenna elements, wherein the feed structure comprises a center-fed and edge-feed feeding mechanism that share at least one waveguide of the plurality of waveguides in which the two waves propagate in opposite directions and are orthogonal to each other, and a pair of ports configured to inject the two waves into the center-fed and edge-feed feeding mechanism;

a directional coupler coupled between first and second waveguides of the plurality of waveguides, the first waveguide being between the directional coupler and the metasurface and the second waveguide being on an opposite side of the directional coupler from the first waveguide, wherein the edge-feed feeding mechanism is configured to provide a first wave of the two waves to the first waveguide and to the second waveguide simultaneously, and wherein the center-feed feeding mechanism is configured to provide a second wave of the two waves to only the second waveguide.

8. The antenna of claim 7 further comprising a controller coupled to the metasurface to tune the RF radiating antenna elements to control the two beams independently of each other.

9. The antenna of claim 8 wherein the controller is operable to control the two beams to have one or more of different pointing directions, different polarizations and different frequency.

10. The antenna of claim 8 wherein the controller is operable to apply a modulation that is the average of the required modulation for the creation of each beam of the two beams.

11. The antenna of claim 7 wherein the array is operable to receive and transmit simultaneously on the two beams.

12. The antenna of claim 7 further comprising a divider to control a ratio of power between the first and second waves.

13. An antenna comprising:

a metasurface having an array of radio-frequency (RF) radiating antenna elements and operable to generate two beams simultaneously in response to interacting with two propagating waves at a same time; and a feed structure coupled to feed the two waves to the array of RF radiating antenna elements, the feed structure has a plurality of waveguides, wherein at least one of the waveguides being beneath the RF radiating antenna elements, wherein the feed structure comprises a center-fed and edge-feed feeding mechanism that share at least one waveguide of the plurality of waveguides in which the two waves propagate in opposite directions and are orthogonal to each other, and a pair of ports configured to inject the two waves into the center-fed and edge-feed feeding mechanism;

a directional coupler coupled between first and second waveguides of the plurality of waveguides, the first waveguide being between the directional coupler and the metasurface and the second waveguide being on an opposite side of the directional coupler from the first waveguide, wherein the edge-feed feeding mechanism is configured to provide a first wave of the two waves to the first waveguide above the directional coupler without entering the second waveguide, and wherein the center-feed feeding mechanism is configured to provide a second wave of the two waves to the second waveguide below the directional coupler.

14. A method comprising:

injecting, via a pair of ports, two feed waves into a feed structure;

propagating the two feed waves using waveguides in the feed structure; and generating, using a metasurface having an array of radio-frequency (RF) radiating antenna elements, two beams simultaneously by interacting with the two feed waves at a same time as the feed waves propagate in opposite directions and are orthogonal to each other.

15. The method of claim 14 wherein the feed structure comprises a center-fed and edge-feed feeding mechanism that share a first waveguide in which the two waves propagate in opposite directions, and wherein injecting, via a pair of ports, two feed waves into a feed structure comprises injecting first and second waves into first and second guides of the first waveguide, respectively, and wherein propagating the two feed waves using waveguides in the feed structure comprises propagating the first wave outwardly through the first guide and then up and into the second guide at outer edges to travel toward a central location in the first waveguide, propagating the second wave outward from the central location in the second guide in an opposite direction of the first wave, and propagating the first and second waves into a second waveguide from the second guide using a directional coupler, and propagating the first and second waves in opposite directions in the second waveguide.

16. The method of claim 14 further comprising applying modulation that is the average of the required modulation for the creation of each beam of the two beams.

* * * * *